US012770353B2

(12) United States Patent
Scuratti

(10) Patent No.: US 12,770,353 B2
(45) Date of Patent: Oct. 20, 2026

(54) SIMULTANEOUS POST-TREATMENT DETECTION PROCESS OF A PLURALITY OF OBJECTS TREATED AND POSITIONED ON A TREATMENT BASE

(71) Applicant: LAB S.R.L., Cinisello Balsamo (IT)

(72) Inventor: Stefano Scuratti, Briosco (IT)

(73) Assignee: LAB S.R.L., Cinisello Balsamo (IT)

( * ) Notice: Subject to any disclaimer, the term of this patent is extended or adjusted under 35 U.S.C. 154(b) by 220 days.

(21) Appl. No.: 18/498,269

(22) Filed: Oct. 31, 2023

(65) Prior Publication Data

US 2024/0242460 A1 Jul. 18, 2024

(30) Foreign Application Priority Data

Jan. 12, 2023 (IT) ........................ 102023000000291

(51) Int. Cl.
*G06V 10/00* (2022.01)
*G06V 10/10* (2022.01)
*G06V 10/22* (2022.01)

(52) U.S. Cl.
CPC ............ *G06V 10/225* (2022.01); *G06V 10/19* (2022.01)

(58) Field of Classification Search
CPC ...... G06V 10/82; G06V 10/225; G06V 10/19; G06T 7/70; B29C 64/386; G05B 19/4183; B33Y 50/00; A61C 13/08; G01N 1/28; G01N 1/44
See application file for complete search history.

(56) References Cited

U.S. PATENT DOCUMENTS 6,801,245 B2 * 10/2004 Shniberg .......... G06K 19/06046 235/494
6,950,123 B2 * 9/2005 Martins ................... G01S 3/781 348/157
7,145,478 B2 * 12/2006 Goncalves ........... G05D 1/0274 340/988
7,506,817 B2 * 3/2009 Gormish .................. G06K 7/14 235/472.01
9,576,183 B2 * 2/2017 Reitmayr .................. G06T 7/73
2024/0054724 A1 * 2/2024 Dibra ................... G06N 3/0464
2024/0242460 A1 * 7/2024 Scuratti .............. G05B 19/4183

* cited by examiner

*Primary Examiner* — Amir Alavi
(74) *Attorney, Agent, or Firm* — NIXON & VANDERHYE

(57) ABSTRACT

A simultaneous post-treatment detection process of objects treated and positioned on a treatment base is provided in which the objects at first are coupled to a device identified by an identification code. The process includes decoupling each object from the device to prepare the object for the treatment; positioning, before treatment, each object on a treatment base; associating, by recording by an electronic computer on a digital storage medium, the code of each device to an allocation position on the treatment base of a respective object at first coupled thereto by phases selected from indicating the allocation position implemented by a visual support adapted to allow a user to display the allocation position on the base, and recognizing an outline, defined by each object and previously acquired by an optical instrument and associated to a respective code, of an object on the base to determine the relative allocation position.

8 Claims, 2 Drawing Sheets

SIMULTANEOUS POST-TREATMENT DETECTION PROCESS OF A PLURALITY OF OBJECTS TREATED AND POSITIONED ON A TREATMENT BASE

BACKGROUND OF THE INVENTION

Field of the Invention

This application claims priority to IT 102023000000291 filed Jan. 12, 2023, the entire contents of which are hereby incorporated by reference.

The present invention relates to a simultaneous post-treatment detection process of a plurality of objects treated and positioned on a treatment base of the type specified in the preamble of the first claim.

In particular, the present invention relates to a process for detecting preferably dental objects wherein the treatment can correspond to sintering and be capable of allowing to obtain an electronically-assisted instrument to detect after sintering the objects arranged on the sintering base.

Description of the Related Art

In the digital implementation of dental, but not only, objects by means of additive or subtractive production, the traceability of objects is usually always guaranteed through positioning via computer in the production devices, for example in zirconia discs mounted on milling machines, and positioning "maps" printed by computer. Their management in the subsequent phases, whether they are painting, assembly, ceramization or still more, is always traceable thanks to the fact that the objects are treated singularly, separately from others, for example placed in single containers, equipped with recognition codes, for example bar codes, to allow to go back easily to the patient or the client corresponding to the contained object.

The described known art includes some important drawbacks.

In fact, although this process is mostly automated and digitalized, there is a passage in which the traceability of the "object-patient" relation is at risk. For the elements made of materials requiring a treatment phase in which several elements are "treated" together, for example thermal sintering of dental objects mainly made of zirconia, it commonly happens that several objects are manually placed by an operator on a sintering base, for example a plane or bed of small balls or other, which is then inserted in the sintering device.

At the end of treatment, the base with the treated objects is extracted from the device and an operator, potentially the same who positioned them or a different one, collects them and re-positions them in the respective container to restore the object-patient matching of the single objects as pre-sintering positioning.

This phase shows clearly an object recognition problem which, considering the analogy in the object shape, for example defined by dental crowns, can be source of even serious errors.

In order to obviate this problem two alternative techniques are commonly applied. One technique consists in engraving a sequential number on each object in the implementation phase, for example during milling. However, this technique has contraindications given by the fact that the object shape results to be modified thereby and that it may be very difficult to engrave numbers on small elements like facets, crowns of small incisors or other.

The second, much more widespread, technique consists in that the operator, who positions manually the objects on the sintering plane, at the same time implements a "map" on a common paper support showing the drawings of the positioned objects and an identification code allowing the subsequent identifiability. The drawback of this second technique, of course, is given by the fact that it wholly relies on the operator's capability to perform a clear "drawing" and to not make errors in its implementation and in its subsequent interpretation which, as already mentioned, could be actually implemented by another operator.

BRIEF SUMMARY OF THE INVENTION

In this situation the technical task underlying the present invention is to devise a simultaneous post-treatment detection process of a plurality of objects treated and positioned on a treatment base capable to obviate substantially to at least part of the mentioned drawbacks.

Within said technical task an important object of the invention is to obtain a simultaneous post-treatment detection process of a plurality of objects treated and positioned on a treatment base allowing to reduce, or even eliminate completely, the possibility of errors in repositioning the objects inside their own original containers after treatment.

Another important object of the invention is to implement a simultaneous post-treatment detection process of a plurality of objects treated and positioned on a treatment base allowing to automate completely the process for implementing such objects.

In conclusion, the technical task underlying the present invention is to implement a simultaneous post-treatment detection process of a plurality of objects treated and positioned on a treatment base allowing to offer to the user an electronic assistance instrument to detect correctly each object among the multitude and to associate the object to its own original external container.

The technical task and the specified objects are achieved by a simultaneous post-treatment detection process of a plurality of objects treated and positioned on a treatment base as claimed in the enclosed claim 1.

Preferred technical solutions are highlighted in the depending claims.

In the present document, the measurements, values, shapes and geometrical references (such as perpendicularity and parallelism), if associated to words such as "about" or other similar terms such as "nearly" or "substantially", are to be meant as excluding measurement errors or imprecisions due to production and/or manufacturing errors and, above all, excluding a slight deviation from the value, measurement, shape or geometrical reference thereto it is associated. For example, such terms, if associated to a value, preferably show a deviation not higher than 10% of the value itself.

Moreover, if used, terms such as "first", "second", "upper", "lower", "main" and "secondary" do not identify necessarily an order, a relation priority or relative position, but they simply can be used to distinguish more clearly components different from each other.

Unless otherwise specified, as it results from the following discussions, it is considered that terms such as "treatment", "computer science", "determination", "calculation", or the like, relate to the action and/or processes of a computer or similar electronic calculation device which handles and/or transforms data represented as physical, such as electronic quantities of registers of a computer system and/or memories in other data similarly represented as physical quantities within computer systems, registers or other devices for storing, transmitting or displaying information.

The measurements and data reported in the present text are to be considered, unless otherwise indicated, as performed in International Standard Atmosphere ICAO (ISO 2533:1975).

The simultaneous post-treatment detection process of a plurality of objects treated and positioned on a treatment base according to the invention is substantially adapted to allow a user to perform the simultaneous treatment of a plurality of objects and then subsequently to identify each object in efficient and rapid manner.

The objects can be of any type. For example, they can be dental objects. Or, they can be tools or mechanical parts or still more.

Generally, each object at first is coupled to a recognition device. The recognition device can be a simple tag, or even a label, coupled to the object.

Or, the recognition device can be a box within which the object is positioned before treatment. Especially, but not only, in case the object is of dental type, the device comprises a small box.

Moreover, the recognition device is identified by an identification code. The identification code preferably is a graphic sign visible on the recognition device. For example, the identification code can be an alphanumeric code or a QRcode, or still a bar code or other similar coding instrument.

On the contrary, the treatment can be a process of any kind adapted to handle one or more features of the object. For example, the treatment can be a surface treatment or a machine processing. Preferably, if the object is of dental type, the treatment consists of object sintering. In fact, very often, the dental objects are components which, after processing on particular materials such as zirconia, require sintering to be stabilized and/or to modify other intrinsic features of the material. Naturally, if the treatment is given by sintering, preferably it is performed in oven. The detection process, then, comprises at least preliminary phases to treatment.

DETAILED DESCRIPTION OF THE PREFERRED EMBODIMENTS

Figure 1:
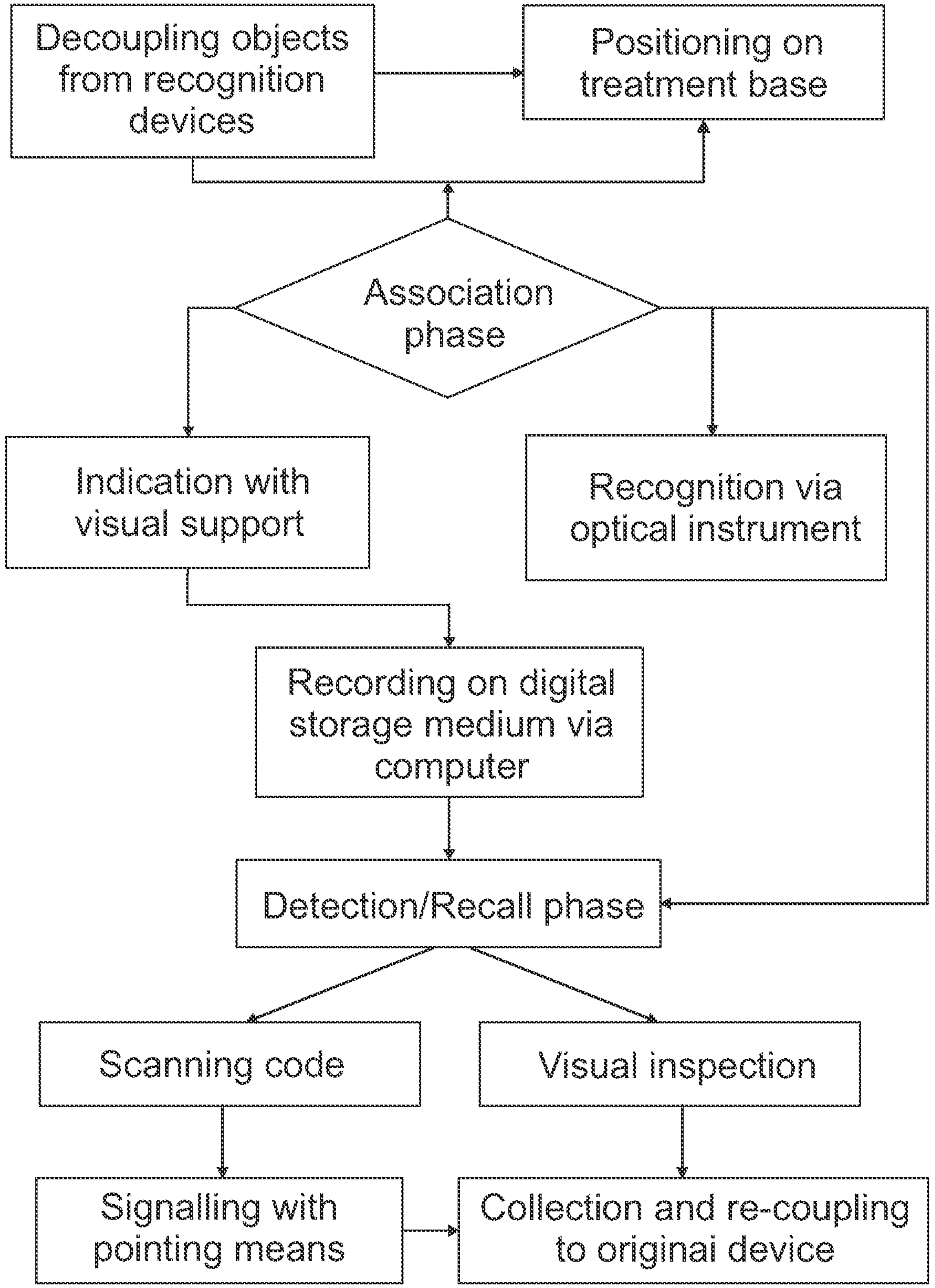
FIG. 1 is a flow chart illustrating the simultaneous post-treatment detection process according to the present invention.
Figure 2:
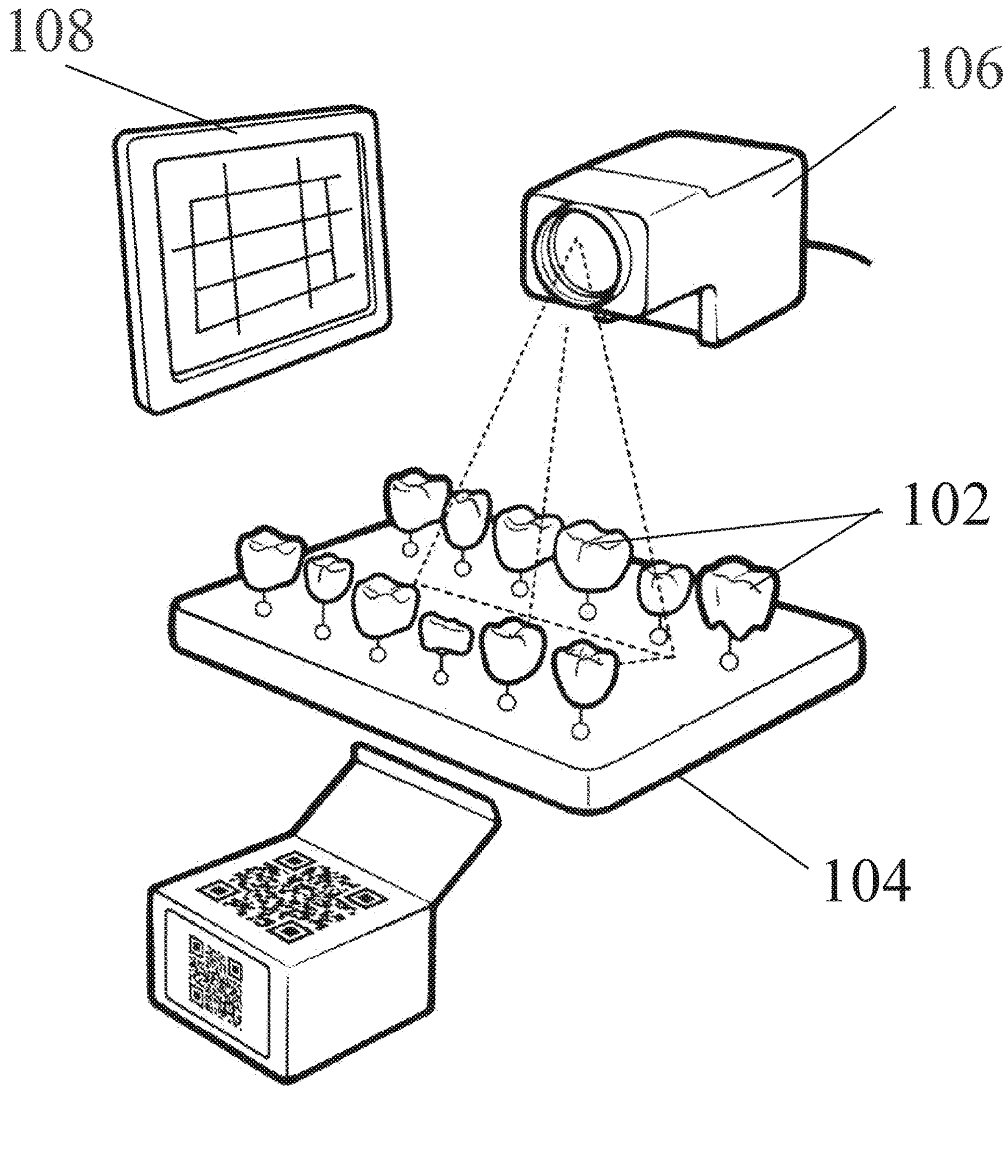
FIG. 2 is a schematic drawing illustrates aspects of the present invention.

In particular, preferably, as illustrated in FIG. 1, the process comprises at least a decoupling phase.

In the decoupling phase, each one of the objects is decoupled from the relative device. In this way, the object is prepared for subsequent treatment.

Moreover, the detection process comprises a positioning phase.

In the positioning phase, preferably, each one of the objects 102 is positioned on a treatment base 104. The treatment base 104 is substantially a support upon which the objects 102 can be firmly rested before starting treatment. In case of sintering, for example, the treatment base 104 can include, or consist of, a tray on which the objects 102 are positioned.

The latter are preferably positioned on the base in an orderly manner. Under the term "orderly" it is meant that the objects are arranged distinctly on the treatment base mutually spaced apart so as to occupy, each one, their own space.

The detection process, then, advantageously comprises at least an association phase.

In the association phase, briefly, the identification code of each device is associated to an allocation position, detected on the treatment base as just described, of a respective object at first coupled thereto.

In particular, preferably, the association is operatively implemented by recording by means of an electronic computer on a digital storage medium.

The electronic computer can include, or consist of, any apparatus capable of processing digital data, for example a computer, a smartphone, a tablet or other similar apparatus.

The storage medium can include, or consist of, any apparatus on which digital data can be recorded, for example a hard disk, a solid memory, pen drive or still more. Naturally, the storage medium can even be part of the electronic computer or can be external thereto. The storage medium could even be a server thereto the electronic computer can access remotely to record data. In this case, the electric computer could be connected to the storage medium through wireless networks, for example internet, to record data in cloud.

In each case, preferably, the electronic computer and the storage medium are at least operatively connected to each other.

The association then can be implemented according to different modes.

For example, the association can include an indication phase.

If present, in the indication phase, the allocation position is designated through the use of a visual support 108. The visual support 106, then, generally is adapted to allow a user to display the allocation position on the treatment base 104.

In this regard, the visual support can be determined by a light spot or even by an outline of said object the allocation portion thereof is associated to the identification code. The outline has not necessarily to correspond to the real outline of the object, but it could even be an indicative projected image of the object to be positioned or another stylized image with the only purpose of indicating the allocation position to the user.

Therefore, the indication could be performed by a laser pointer or even a projector 108 capable of projecting images on the treatment base 104.

The indication provides an instrument through which the user or the robot is guided to position subsequently the objects on the treatment base in the allocation positions indicated by the visual support. Then, in this case, the association or indication phase acts as guide for the subsequent or simultaneous positioning phase. If the visual support is given by a signal pointed at or projected on the treatment base, the positioning can take place in sequence for each object by following the relative indication.

Alternatively to what described, the association could include a reproduction phase. The latter could be the ending part, that is a sub-phase, of the indication phase.

In this case, the association occurred in the digital storage medium could be reproduced by the computer like a graphic mapping viewable by the user. In other words, the computer could be configured to reproduce, at the end of the association, a graphic mapping of the association.

The graphic mapping may correspond to an image, in case a stylized image, of the treatment base whereon the identification codes are shown at the respective allocation positions of the object associated thereto.

The graphic map, then, can be represented on a screen, for example a display of a computer. Or, the representation can even be reproduced in a file readable by any computer and, in case, even printed so as to appear as paper.

The association phase can include, alternatively or together with the indication phase, a recognition phase.

If present, the recognition phase is subsequent to the positioning phase. Moreover, the recognition phase preferably is further subsequent to an acquisition phase. If present, the acquisition phase is prior or simultaneous to the positioning phase.

In the acquisition phase, preferably, the outline of each object is acquired by means of an optical instrument. Therefore, the optical instrument can include, or consist of, a camera or TV camera o other similar object capable of acquiring images by means of an objective. In this phase, substantially, the outline of each object is associated to a respective identification code.

Therefore, the association between identification code and allocation position is completed when, after positioning on the treatment base, the outline of an object on the treatment base and in a given allocation position is recognized by the optical instrument to determine, indeed, the relative allocation position and to associate it to the identification code corresponding to the recognized outline.

Therefore, depending upon the type of implemented association, the process can include an association implemented entirely, and then completed, prior to positioning, as in the case in which the association provides an indication phase.

Alternatively, the process can include an association completed, in sequence for each object, subsequently to positioning if, prior to or simultaneously to positioning, the acquisition phase is implemented in which the identification code is associated to a respective outline of the object.

Moreover, depending upon the type of association, the positioning phase may be subject to variations regarding the execution mode.

In fact, the positioning phase can be performed by following the indications of the visual support or even freely if the process comprises the recognition phase considering that the association is completed after positioning.

Moreover, in any case the positioning phase can be implemented manually by the user or by a robot or other apparatus which can be driven or programmed to perform positioning procedures autonomously.

In addition to what described, the process advantageously comprises a detection phase.

In the detection phase, the object position on the treatment base is detected for each identification code whenever the user recalls an identification code recorded on the storage medium.

In other terms, the user requests to the storage medium that, against presentation of the identification code, the relative allocation position associated to the identification code is indicated thereto.

In order to perform the request, as already mentioned, the user preferably performs a recall.

The recall can be implemented according to different modes alternative or even co-existent to each other.

For example, the recall can be implemented by means of visual inspection, for example simply by ocular consultation, if the association on the digital storage medium is reproduced by the computer as a graphic mapping viewable by the user.

In this case, for example, the user may consult the graphic mapping on screen or on paper and consult the map to determine the allocation position of each identification code.

Alternatively or simultaneously, the recall can be implemented by scanning an identification code by means of a scanning instrument operatively connected to the computer.

This recall is preferred especially if the process is implemented by a system which also includes pointing means. The pointing means is preferably configured to project a visual signal on the treatment base at the allocation position corresponding to the scanned identification code. They can be similar to the means adapted to generate the visual support or they can even be the same. Moreover, even the visual signal can consist of a light spot or an outline of an object the allocation portion thereof is associated to the scanned identification code.

Therefore, the detection phase can include a signalling phase. The signalling phase, implemented when the identification code is scanned, signals to the user the allocation position associated to the identification code through the pointing means. Additionally, the process preferably comprises a collection phase.

In the collection phase each object is collected from the treatment base and it is coupled, based upon the detection phase, to a respective device identified by the associated identification code.

Naturally, the invention also comprises an identification system comprising means to implement a process as described previously.

Moreover, the invention also comprises a computer programme comprising instructions which, when the programme is run by the computer, allow the computer to perform a process as described previously.

In conclusion, the invention also comprises filing means readable by computer comprising instructions which, when the programme is run by the computer, allow the computer to perform a process as described previously.

The simultaneous post-treatment detection process of a plurality of objects treated and positioned on a treatment base according to the invention achieves important advantages.

In fact, the simultaneous post-treatment detection process of a plurality of objects treated and positioned on a treatment base allows to reduce, or even eliminate completely, the possibility of errors in coupling with the recognition device and then, for example, the repositioning of the objects inside their own original containers after treatment.

Moreover, the simultaneous post-treatment detection process of a plurality of objects treated and positioned on a treatment base allows to automate completely the process for implementing such objects.

In conclusion, the simultaneous post-treatment detection process of a plurality of objects treated and positioned on a treatment base allows to offer to the user an electronic assistance instrument to detect correctly each object among the multitude and to associate the object to its own original recognition device.

The invention is subject to variations falling within the inventive concept defined by the claims.

In such scope all details can be replaced by equivalent elements and the materials, shapes and sizes can be any.

The invention claimed is:

1. A simultaneous post-treatment detection process of a plurality of objects treated and positioned on a treatment base, said objects being, respectively, at first coupled to a recognition device identified by an identification code, said process comprising:

decoupling each said object from said relative device for preparing said object to said treatment;

positioning, before said treatment, each one of said objects on a treatment base;

and being wherein it further comprises associating, by recording by means of an electronic computer on a digital storage medium, said identification code of each said device to an allocation position on said treatment base of a respective said object at first coupled thereto by one or more phases selected from:

a phase of indicating said allocation position implemented by means of a visual support adapted to allow a user to display said allocation position on said treatment base, and a phase of recognizing an outline, defined by each said object and previously acquired by an optical instrument and associated to a respective said identification code, of said object on said treatment base to determine said relative allocation position;

detecting to said user said allocation position of said object on said treatment base for each said identification code whenever said user recalls said identification code recorded on said storage medium, said recall being implemented:

by means of visual inspection by said user if said association on said digital storage medium is reproduced by said computer as a graphic mapping viewable by said user, and/or by scanning said identification code by means of a scanning instrument operatively connected to said computer.

2. The process according to claim 1, wherein said detection comprises, when said identification code is scanned, the fact of signalling to said user said allocation position associated to said identification code through pointing means configured to project a visual signal on said treatment base at said allocation position.

3. The process according to claim 1, wherein said signal is a light spot or an outline of said object, said allocation portion thereof is associated to said identification code.

4. The process according to claim 1, wherein in said identification phase said visual support is a light spot or an outline of said object, said allocation portion thereof is associated to said identification code.

5. The process according to claim 1, wherein said association phase is completed prior to said positioning or said association phase is completed, in sequence for each said object, subsequently to said positioning if, prior to or simultaneously to said positioning, an acquisition phase is performed wherein said identification code is associated to a respective outline of said object.

6. The process according to claim 1, wherein said positioning is performed manually by said user or by a robot by following the indications of said visual support or freely if said process comprises said recognition phase.

7. The process according to claim 1, further comprising a collection phase wherein each said object is collected from said treatment base and it is coupled, based upon said detection phase, to a respective said device identified by said associated identification code.

8. An identification system comprising means adapted to implement the process according to claim 1.

* * * * *